United States Patent
Cheung et al.

(10) Patent No.: US 10,573,453 B2
(45) Date of Patent: Feb. 25, 2020

(54) POSITION SENSING USING COIL SENSOR

(71) Applicant: TEXAS INSTRUMENTS INCORPORATED, Dallas, TX (US)

(72) Inventors: Charles Ho Yin Cheung, Dublin, CA (US); Evgeny Fomin, San Carlos, CA (US); Christopher Alan Oberhauser, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 243 days.

(21) Appl. No.: 14/745,171

(22) Filed: Jun. 19, 2015

(65) Prior Publication Data

US 2015/0369631 A1 Dec. 24, 2015

Related U.S. Application Data

(60) Provisional application No. 62/014,535, filed on Jun. 19, 2014.

(51) Int. Cl.
*H01F 27/28* (2006.01)
*G01D 5/20* (2006.01)

(52) U.S. Cl.
CPC ......... *H01F 27/2804* (2013.01); *G01D 5/202* (2013.01); *G01D 5/2013* (2013.01)

(58) Field of Classification Search
CPC ....... H01F 27/2804; G01D 5/202; G01D 5/20
See application file for complete search history.

(56) References Cited

U.S. PATENT DOCUMENTS

| | | | | |
|---|---|---|---|---|
| 5,420,507 A | * | 5/1995 | Laskowski | G01N 27/72 324/207.16 |
| 5,489,845 A | * | 2/1996 | Weber | F02D 11/10 324/207.16 |
| 5,696,444 A | * | 12/1997 | Kipp | F04D 15/0088 324/207.16 |
| 6,236,200 B1 | * | 5/2001 | Nekado | G01V 3/105 324/174 |
| 6,437,573 B1 | * | 8/2002 | Golder | G01V 3/108 324/232 |
| 6,512,360 B1 | * | 1/2003 | Goto | G01D 3/0365 324/120 |
| 6,566,862 B1 | * | 5/2003 | Goto | G01D 3/0365 324/207.16 |

(Continued)

*Primary Examiner* — Alvaro E Fortich
(74) *Attorney, Agent, or Firm* — John R. Pessetto; Charles A. Brill; Frank D. Cimino (57) ABSTRACT

A printed circuit board (PCB). The PCB comprises a non-conductive substrate and a plurality of conductive coil loops formed on the substrate, wherein the coil loops are asymmetric. The conductive coil loops are formed as a continuous metal trace on the substrate, the coil loops are symmetric with reference to a longitudinal axis of the PCB, the coil loops are asymmetric with reference to an axis transverse to the longitudinal axis of the PCB, wherein the distance between adjacent coil loops crossing the longitudinal axis on a first side of a center of an innermost coil loop are substantially equal, and the distance between adjacent coil loops crossing the longitudinal axis on a side of the center of the innermost coil loop opposite to the first side of the center of the innermost coil loop increase with each coil loop progressing outwards.

18 Claims, 3 Drawing Sheets

(56) References Cited

U.S. PATENT DOCUMENTS

| | | | | |
|---|---|---|---|---|
| 2001/0019262 | A1* | 9/2001 | Woolsey | G01B 7/023 |
| | | | | 324/207.26 |
| 2002/0105320 | A1* | 8/2002 | Lequesne | G01D 5/2013 |
| | | | | 324/207.15 |
| 2006/0132120 | A1* | 6/2006 | Luber | G01D 5/202 |
| | | | | 324/207.16 |
| 2006/0233123 | A1* | 10/2006 | Lee | G01D 5/202 |
| | | | | 370/295 |
| 2008/0258717 | A1* | 10/2008 | Igney | A61B 5/0522 |
| | | | | 324/222 |
| 2009/0217711 | A1* | 9/2009 | May | G01D 5/145 |
| | | | | 68/12.04 |
| 2009/0256555 | A1* | 10/2009 | Elliott | G01B 7/003 |
| | | | | 324/207.24 |
| 2011/0128014 | A1* | 6/2011 | Harrison | G01D 5/145 |
| | | | | 324/601 |
| 2013/0057267 | A1* | 3/2013 | Klein | G01R 15/185 |
| | | | | 324/234 |
| 2013/0160570 | A1* | 6/2013 | Ayanji | G01L 5/0038 |
| | | | | 73/862.381 |
| 2013/0311130 | A1* | 11/2013 | Horton | F01D 17/02 |
| | | | | 702/142 |
| 2014/0062464 | A1* | 3/2014 | Reymann | G01D 5/2515 |
| | | | | 324/207.15 |
| 2014/0117980 | A1* | 5/2014 | Ely | G01D 5/2046 |
| | | | | 324/207.17 |
| 2014/0288796 | A1* | 9/2014 | Muller | G01D 5/2006 |
| | | | | 701/70 |
| 2015/0222128 | A1* | 8/2015 | Hansen | A61N 1/3787 |
| | | | | 307/104 |
| 2017/0108467 | A1* | 4/2017 | Savonen | B03C 1/0335 |

* cited by examiner

POSITION SENSING USING COIL SENSOR

CROSS-REFERENCE TO RELATED APPLICATIONS

The present application claims priority to U.S. Provisional Patent Application No. 62/014,535, filed Jun. 19, 2014, titled "Position Sensing by Asymmetrical Coil Sensor," which is hereby incorporated herein by reference in its entirety.

BACKGROUND

Determining the position of an object automatically or electronically is a useful capability in many systems. For example, automatic control systems may use indications of positions of objects to adjust the position of the object. Various robotic mechanisms may use indications of position of objects, for example robots used in manufacturing automobiles or other machinery. A wide variety of electronic position sensing devices are known. Some position sensing devices rely upon mechanical coupling to the object, for example a gear coupled to a roller coupled to a belt (e.g., a conveyor belt) may engage a gear of an electromechanical position sensor. Other position sensing devices may be contactless and may not physically contact the object whose position is being determined.

SUMMARY

In an embodiment, a printed circuit board (PCB) is disclosed. The printed circuit board comprises a non-conductive substrate and a plurality of conductive coil loops formed on the substrate, wherein the coil loops form an asymmetric electric coil.

In another embodiment, a position sensor is disclosed. The position sensor comprises an asymmetric electric coil and a transducer coupled to the asymmetric electric coil. The asymmetric electric coil comprises a plurality of conductive coil loops, wherein the coil loops are asymmetric with reference to an axis transverse to a longitudinal axis of the coil. The transducer is configured to provide an excitation signal to the asymmetric coil, to determine a response of the asymmetric coil to the excitation signal and to determine an output signal based on the response of the asymmetric coil to the excitation signal, wherein the output signal comprises an indication of position of an external target.

In still another embodiment, a method of determining position of an object is disclosed. The method comprises exciting an asymmetric electric coil with an alternating current signal, generating a time-varying asymmetric magnetic field by the asymmetric electric coil, inducing eddy currents in an electrically conductive target coupled to the object by action of the time-varying asymmetric magnetic field, wherein an amplitude of the eddy currents is determined by the position of the target relative to the asymmetric magnetic field, determining an inductance of the asymmetric electric coil, wherein the inductance varies in part based on the eddy currents induced in the target, and determining a position of the object based on the inductance of the asymmetric electric coil.

In yet another embodiment, a printed circuit board is disclosed. The printed circuit board comprises a non-conductive substrate and a plurality of conductive coil loops. The conductive coil loops are formed as a continuous metal trace on the substrate, wherein the coil loops are asymmetric with reference to an axis transverse to a longitudinal axis of the printed circuit board, wherein the spaces between coil loops crossing the longitudinal axis on a first side of a center of an innermost coil loop are substantially equal, and the spaces between coil loops crossing the longitudinal axis on a side of the center of the innermost coil loop opposite to the first side of the center of the innermost coil loop increase with each coil loop progressing outward.

These and other features will be more clearly understood from the following detailed description taken in conjunction with the accompanying drawings and claims.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The present disclosure teaches an asymmetric electric coil for use in sensing the position of a target and hence in determining the position of the target, or an object mechanically coupled to the target, such as, for example a clutch mechanism, a headlamp, a machining table such as a CNC machining system, or another device. The electric coil comprises a plurality of conducting loops, disposed in substantially the same plane, that are asymmetric with respect to a transverse axis of the coil. When excited by an input alternating current (AC) signal, the coil generates an asymmetric time-varying magnetic field. This asymmetric time-varying magnetic field induces eddy currents in the target, where the amplitude of the eddy currents is determined in part by the intensity of the asymmetric time-varying magnetic field proximate to the target. These eddy currents themselves generate a magnetic field that opposes the asymmetric time-varying magnetic field generated by the electric coil. The interaction of the eddy currents (e.g., the opposing time-varying magnetic field generated by the eddy currents) with the electric coil reduces the effective inductance of the electric coil. The amount of reduction of effective inductance can be determined at the terminals of the electric coil, and this is an indicator of the position of the target along a longitudinal axis of the electric coil. In an embodiment, the asymmetric coil is configured to generate an asymmetric time-varying magnetic field in response to the excitation signal, wherein the asymmetric coil is configured to generate an asymmetric time-varying magnetic field in response to the excitation signal; wherein the magnetic field is magnified by a relative permeability μ in the external target thereby causing an increase of the inductance of the asymmetric coil that varies in magnitude based on a position of the external target relative to the asymmetric coil, and wherein the asymmetric coil is configured to present varying inductance in response to a time-varying magnetic field induced in the external target, and wherein the external target comprises a ferrous material.

Figure 1:
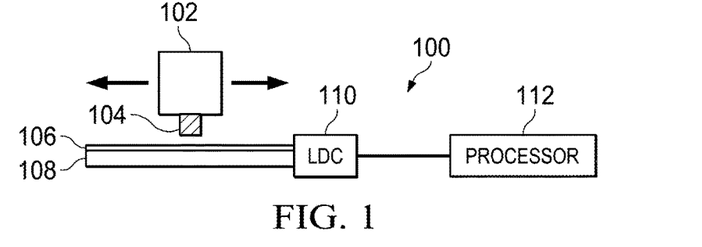
FIG. 1 shows a contactless position sensing system in accordance with various examples.

Turning now to FIG. 1, in an embodiment, a system 100 comprises an object 102, a target 104 mechanically coupled to the object, an asymmetric electric coil 106 disposed and/or formed on a substrate 108, an inductance-to-digital converter (LDC) 110, and a processor 112 communicatively coupled to the LDC 110. The LDC 110 provides an alternating current (AC) excitation signal to the asymmetric electric coil 106. The excitation signal causes the asymmetric electric coil 106 to generate a time-varying magnetic field, where the time-varying magnetic field is asymmetric. For example, the intensity of the asymmetric time-varying magnetic field varies in intensity from a first end of a longitudinal axis of the coil 106 to an opposite end of the longitudinal axis of the coil 106.

In an embodiment, the target 104 comprises electrically conductive media (e.g., an iron, steel, aluminum, copper, bronze, or other electrically conductive metal), and hence the time-varying magnetic field generated by the coil 106 induces eddy currents in the target 104. The target 104 may have a fixed and/or known geometry. In an embodiment, when a plurality of systems 100 are manufactured or assembled, each of the targets 104 may have substantially identical geometry and/or dimensions (within limits of manufacturing tolerances). The present disclosure contemplates using ferrous electrically conductive media to make the target 104 as well as using non-ferrous electrically conductive media to make the target 104. If the target 104 comprises conductive non-ferrous material or a conductive ferrous material (such as Iron) in a high frequency (frequency greater than 1 MHz) AC magnetic field, proximity of the target 104 to the coil 106 may decrease the inductance sensed by the LDS 110. In an embodiment, the target 104 may be a non-conductive ferrous material, such as ferrite. If the target 104 comprises non-conductive ferrous material or conductive ferrous material in low-frequency (frequency less than 500 kHz) AC magnetic field, proximity of the target 104 to the coil 106 may increase the inductance sensed by the LDS 110. In each of these cases, the proximity of the target 104 to the coil 106 alters the inductance sensed by the LDS 110. In an embodiment, a ferrous target 104 may increase the inductance due to magnetic field magnification in the target 104.

The eddy currents in the target 104 generate a magnetic field that opposes and hence attenuates the time-varying magnetic field generated by the coil 106. This attenuated time-varying magnetic field reduces an effective inductance of the asymmetric coil 106, as sensed by the LDC 110 at the terminals of the asymmetric coil 106. The LDC 110 outputs a digital indication of the effective inductance of the asymmetric coil 106 to the processor 112. In some contexts, the LDC 110 may be referred to as a transducer. The processor 112 analyses the indication of effective inductance and determines a position of the target 104 and hence a position of the object 102 from that analysis. Because the amplitude of the eddy currents varies with the intensity of the time-varying magnetic field generated by the asymmetric coil 106, and because the intensity of the time-varying magnetic field varies with position of the target 104 as it moves relative to the asymmetric coil 106 (the time-varying magnetic field generated by the asymmetric coil 106 is asymmetric and hence not constant as the target 104 sweeps or moves over the asymmetric coil 106), the changing inductance can be mapped to a position of the target 104 along the longitudinal axis relative to the coil 106.

In an embodiment, the motion of target 104 may be substantially restricted to linear motion parallel to the longitudinal axis of the coil 106, thus variation in eddy currents in the target 104 can be attributed as substantially due to and indicative of linear motion parallel to the longitudinal axis of the coil 106. This motion may be referred to as a longitudinal motion of the target 104 and/or of the object 102; this position may be referred to as a longitudinal position of the target 104 and/or a longitudinal position of the object 102. A stand-off distance of the target 104 from the coil 106 may remain substantially constant as the target 104 moves parallel to the longitudinal axis of the coil 106.

The asymmetric electric coil 106, the substrate 108 on which the coil 106 is provided, and the LDC 110 may comprise a linear position sensor. Alternatively, one may consider the linear position sensor to comprise the asymmetric electric coil 106, the substrate 108, and the LDC 110, as well as the processor 112. The asymmetric electric coil 106 and the substrate 108 may be said to be a printed circuit board (PCB). In an embodiment, the PCB comprises the asymmetric electric coil 106, the substrate 108, and the LDC 110. In an embodiment, the PCB comprises the asymmetric electric coil 106, the substrate 108, the LDC 110, and the processor 112.

In an embodiment, the effective inductance of the asymmetric electric coil 106 may vary about 5% across the full range of linear motion of the target 104 parallel to the longitudinal axis of the asymmetric electric coil 106. In an embodiment, a greater range of linear motion of the target 104—and hence a greater range of linear motion of the object 104—may be determined by employing a plurality of linear position sensors, offset in linear position to each other, such that when the target reaches the far end of a first asymmetric electric coil 106 of a first sensor it is on the near edge of a second asymmetric electric coil 106 of a second sensor, and when the target reaches the far end of the second asymmetric electric coil 106 of the second sensor it is on the near edge of a third asymmetric electric coil 106 of a third sensor. Any number of coils 106 can be positioned adjacent one another to provide for a larger sensing area. The processor 112 may be communicatively coupled to all three of the sensors and combine the position indications to determine a linear position over the complete linear motion range of the three sensors.

The asymmetric electric coil 106 may be formed as a conductive metallic trace on one or more layers of the substrate. The coil loops of the asymmetric electric coil 106—whether formed in a single layer of the substrate 108, two layers of the substrate 108, four layers of the substrate 108, or some other number of layers of the substrate—may be said to be a substantially flat electric coil (for example, the dimensions of such a "flat coil" may be approximately 10 cm long, 1 cm wide, and 0.05 cm thick).

Figures 2, 3:
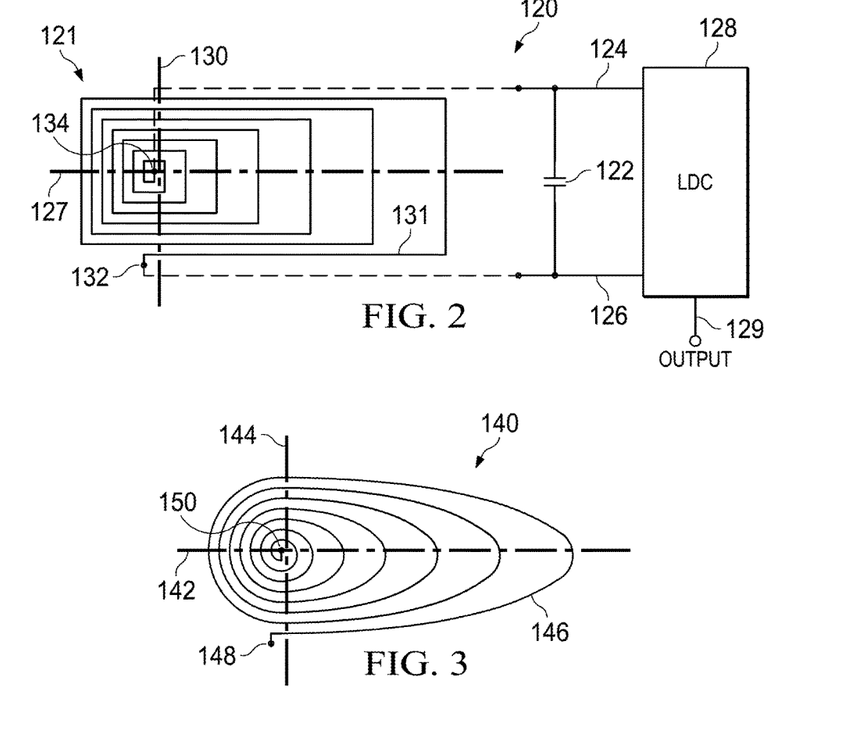
FIG. 2 shows an asymmetric electric coil in accordance with various examples.
FIG. 3 shows another asymmetric electric coil in accordance with various examples.

FIG. 2 illustrates an example of the use of an asymmetric electric coil in a position sensor system 120. In the embodiment shown, the system 120 comprises an asymmetric electric coil 121 electrically coupled in parallel to a capacitor 122. The parallel circuit of the coil 121 and capacitor 122 are connected by lines 124, 126 to an LDC 128. The output of the LDC 128, an indication of effective inductance of the coil 121, is provided at line 129. In some examples, the asymmetric coil 121 has a generally rectangular geometry because the loops of the coil 121 are substantially rectangular in shape as shown in the example of FIG. 2. The asymmetric electric coil 121 has a longitudinal axis 127 and a transverse axis 130, passing through the center of the innermost coil loop, that is transverse to the longitudinal axis 127. The asymmetric electric coil 121 may be approximately symmetric with reference to the longitudinal axis 127 or may slightly asymmetric with reference to the longitudinal axis 127. By contrast, the asymmetric electric coil 121 is highly asymmetric with reference to the transverse axis 130.

The asymmetric electric coil 121 comprises a single continuous metal trace 131 that has a first terminal 132 and a second terminal 134. The first terminal 132 may be electrically coupled to the line 126, and the second terminal 134 may be electrically coupled to the line 124. The asymmetric electric coil 121 may be formed on a non-conductive substrate of a printed circuit board, for example the substrate 108 of FIG. 1. In an embodiment, the substrate may be flexible or may be a flex circuit. Alternatively, the substrate may be structurally stiff. In an embodiment, the single continuous metal trace 131 is disposed in a single layer of the substrate and may be flat or planar. Connection to the second terminal 134 may be made through a via in the substrate. In other embodiments, the single metal trace 131 may be disposed on two layers of the substrate, four layers of the substrate, or some other number of layers of the substrate, where connections between layers are provided by vias.

When the asymmetric electric coil 121 is stimulated by an AC signal, the coil 121 generates an asymmetric time-varying magnetic field. The magnetic field is less intense where the coil loops are more open (e.g., to the far right of the transverse axis 130) and more intense where the coil loops are closer together (e.g., to the near right of the transverse axis 130). Thus, the eddy currents induced in the target 104 when it is at the far right of the transverse axis 130 will be small and the reduction of the effective inductance of the asymmetric electric coil 121 sensed by the LDC 128 will be small (e.g., the effective inductance will be least affected). When the target 104 is near the center of the innermost coil loop, the eddy currents will be higher and the change of the effective inductance of the asymmetric electric coil 121 sensed by the LDC 128 will be larger (e.g., the effective inductance will be near its minimum value).

In an embodiment, the LDC 128 may stimulate the parallel circuit of the coil 121 and capacitor 122 by sweeping the AC signal across a range of frequencies. The LDC 128 may detect a resonance of the parallel circuit (e.g., a frequency at which the parallel circuit is resonant or oscillates). The LDC 128 can determine the effective inductance of the asymmetric electric coil 121 based on the known capacitance of the capacitor 122 and based on the resonant frequency and/or based on the oscillation frequency. This effective inductance can be output by the LDC 128 on line 129, for example, as a digital value. A processor, such as processor 112, may look up a longitudinal position of the target 104 and/or the object 102 in a look-up table based on the effective inductance output on line 129 by the LDC 128, or otherwise calculate the longitudinal position based on the effective inductance.

In an embodiment, the asymmetric electric coil 121 may be about 1 cm wide and 10 cm long. In an embodiment, the asymmetric electric coil 121 may have 17 turns or coil loops. In an embodiment, the asymmetric electric coil 121 may have 23 turns. In an embodiment, the metal trace 131 that forms the coil 121 may be about 4 mil wide (4/1000 inch) and the minimum space between trace segments (at the portion of the coil 121 at the far left side of the FIG. 2) may be about 4 mil. In another embodiment, the metal trace 131 that forms the coil 121 may be about 6 mil wide (6/1000 inch) and the minimum spacing between the metal trace segments may be about 6 mil. It will be appreciated that the present teachings may advantageously be applied to asymmetric electric coils 121 having different physical dimensions and having different numbers of turns or coil loops. These examples are provided to help establish in the mind a clear image of the asymmetric electric coil 121 through a few concrete examples.

Note while the distance between coil loops to the right of the transverse axis 130 illustrated in FIG. 2 increases with each loop, in another embodiment, the distance between subsequent coil loops may be constant. Said in other words, in an embodiment, a first distance between adjacent coil loops crossing the longitudinal axis 127 on a first side of a center of an innermost coil loop (e.g., left side of the transverse axis 130) is substantially equal and a second distance between adjacent coil loops crossing the longitudinal axis 127 on a side of the center of the innermost coil loop opposite to the first side of the center of the innermost coil loop (e.g., right side of the transverse axis 130) is substantially equal and wherein the second distance is greater than the first distance. Thus, the first distance may be small and the second distance is substantially larger than the first distance. In an embodiment, the second distance is at least two times as big as the first distance. In an embodiment, the second distance may be at least five times as big as the first distance. In an embodiment the second distance may be at least ten times as big as the first distance. In an embodiment, the distance between coil loops on the right side of the transverse axis 130 and whether the distance between loops is equal or unequal may be used to establish a linear response to target position or a non-linear response to target position, for example as discussed with reference to FIG. 6.

In an embodiment, the distance between adjacent coil loops crossing the longitudinal axis 127 on a first side (e.g., left side) of a center of an innermost coil loop is substantially equal and the distance between adjacent coil loops crossing the longitudinal axis 127 on a side (e.g., right side) of the center of the innermost coil loop opposite to the first side of the center of the innermost coil loop is substantially larger than on the first side. In an embodiment, the ratio of the distance between adjacent coil loops on the second side to the distance between adjacent coil loops on the first side is at least 3:1. In some contexts, this may be referred to as highly asymmetrical with reference to the transverse axis. In some contexts, this may be referred to as a transverse asymmetry ratio of at least 3:1. By contrast, a ratio of the distance between adjacent coil loops crossing the transverse axis 130 on a third side (e.g., the top side) and the center of the innermost coil loop to the distance between adjacent coil loops crossing the transverse axis 130 on a fourth side (e.g., the bottom side) and the center is less than 3:2 and greater than 2:3 (e.g., is at most slightly asymmetric and may be said to be substantially symmetrical).

In an embodiment, the ratio of a lateral width of an outermost coil loop of the asymmetric electric coil 121 to a lateral width of an innermost coil loop of the asymmetric electric coil 121 may be greater than 30, greater than 50, or greater than 100. In some contexts, this may be said to be highly asymmetrical with reference to the transverse axis 130. With reference to the rectangular shaped coil loops illustrated in FIG. 2, the lateral width of a coil loop of the asymmetric electric coil 121 refers to the width of the coil loop where it is intercepted by the longitudinal axis 127. In some contexts, this may be referred to as a transverse asymmetry outer loop ratio. Another way of conceptualizing the degree of asymmetry of the coil 121 with reference to the transverse axis 130 versus the longitudinal axis 127 is to imagine a center of mass of the loops and its location relative to the transverse axis 130 and relative to the longitudinal axis 127. The imaginary center of mass of the coil 120 would be relatively close to the longitudinal axis 127 but well away from the transverse axis 130, to the right of the transverse axis 130.

Turning now to FIG. 3, an asymmetric electric coil 140 is described. The asymmetric coil 140 may be said to have an oval geometry. The coil 140 may be approximately symmetric about a longitudinal axis 142 and is asymmetric about a transverse axis 144, passing through the center of the innermost coil loop, transverse to the longitudinal axis 142. The asymmetric electric coil 140 comprises a single continuous metal trace 146 that has a first terminal 150 and a second terminal 148. In an embodiment, the asymmetric electric coil 140 may be implemented as a plurality of coil loops that have a circular geometry rather than the oval geometry illustrated in FIG. 3. It is understood that the asymmetric coil 140 may be used with a capacitor and a LDC in a manner similar to the capacitor 122 and LDC 128 described with reference to FIG. 2 to form a position sensor. Note while the distance between coil loops to the right of the transverse axis 144 illustrated in FIG. 3 increases with each loop, in another embodiment, the increase in distance between subsequent coil loops may be constant. Said in other words, distance between adjacent coil loops crossing the longitudinal axis 142 on a first side (e.g., left side) of a center of an innermost coil loop is substantially equal and the distance between adjacent coil loops crossing the longitudinal axis 142 on a side of the center of the innermost coil loop opposite to the first side of the center of the innermost coil loop is substantially larger than on the first side or increases with each coil loop progressing outwards. In an embodiment, the ratio of a lateral width of an outermost coil loop of the asymmetric electric coil 140 to a lateral width of an innermost coil loop of the asymmetric electric coil 140 may be greater than 30, greater than 50, or greater than 100. With reference to the oval shaped coil loops illustrated in FIG. 3, the lateral width of a coil loop of the asymmetric electric coil 140 refers to the width of the coil loop where it is intercepted by the longitudinal axis 142.

Figure 4:
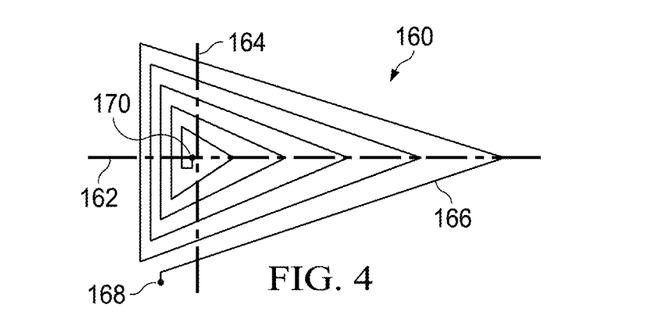
FIG. 4 shows yet another asymmetric electric coil in accordance with various examples.

Turning now to FIG. 4, an asymmetric electric coil 160 is described. The asymmetric coil 160 may have a triangular geometry. The coil 160 may be approximately symmetric about a longitudinal axis 162 and is asymmetric about a transverse axis 164, passing through the center of the innermost coil loop, transverse to the longitudinal axis 162. The asymmetric electric coil 160 comprises a single continuous metal trace 166 that has a first terminal 168 and a second terminal 170. It is understood that the asymmetric electric coil 160 may be used with a capacitor and a LDC in a manner similar to the capacitor 122 and LDC 128 described with reference to FIG. 2 to form a position sensor. Note while the distance between coil loops to the right of the transverse axis 164 illustrated in FIG. 4 increases with each loop, in another embodiment, the distance between subsequent coil loops may be constant. Said in other words, distance between adjacent coil loops crossing the longitudinal axis 162 on a first side (e.g., left side) of a center of an innermost coil loop is substantially equal and the distance between adjacent coil loops crossing the longitudinal axis 162 on a side of the center of the innermost coil loop opposite to the first side of the center of the innermost coil loop is substantially larger than on the first side or increases with each coil loop progressing outwards. In an embodiment, the ratio of a lateral width of an outermost coil loop of the asymmetric electric coil 160 to a lateral width of an innermost coil loop of the asymmetric electric coil 160 may be greater than 30, greater than 50, or greater than 100. With reference to the triangular shaped coil loops illustrated in FIG. 4, the lateral width of a coil loop of the asymmetric electric coil 160 refers to the width of the coil loop where it is intercepted by the longitudinal axis 162.

While asymmetric electric coils having rectangular, oval, circular, and triangular geometries have been described and/or illustrated, it is understood that the teachings of the present disclosure may advantageously be applied to other asymmetric electric coil geometries, for example to an asymmetric electric coil having a plurality of pentagon shaped coil loops, to an asymmetric electric coil having a plurality of hexagon shaped coil loops, and other polygonal shapes. An asymmetric electric coil having a plurality of rhombus shaped coil loops is contemplated by the present disclosure.

Figure 5:
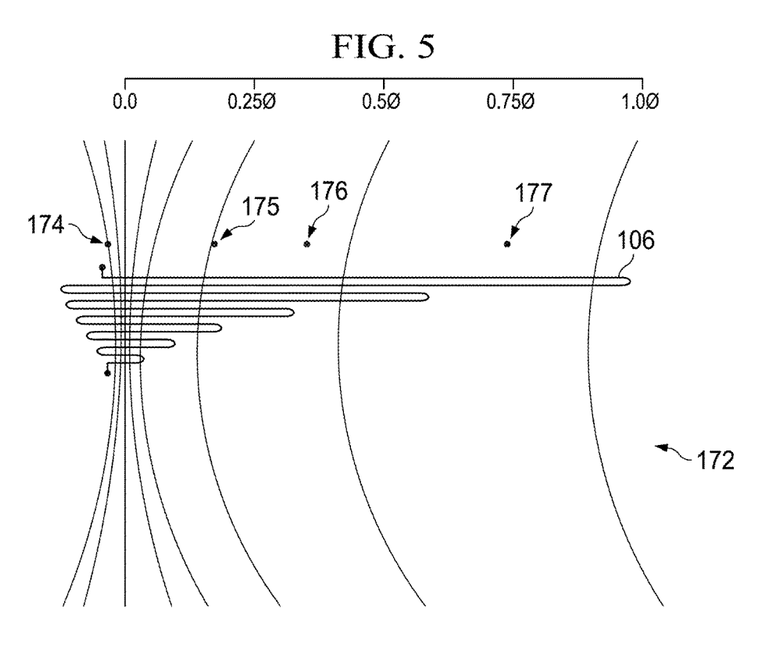
FIG. 5 shows an asymmetric magnetic field generated by an asymmetric electric coil in accordance with various examples.

Turning now to FIG. 5, an illustration of an asymmetric magnetic field 172 is described. The asymmetric electric coil 106 is illustrated in FIG. 5 as seen from the side. The vertical spacing between coil loops (in an embodiment, there may be little or no vertical spacing between the coil loops) is exaggerated in the illustration to promote better visualization of the coil loop spacing. As an AC excitation current is passed through the coil 106, the coil loops establish a time-varying magnetic field. Because of the asymmetric form of the coil 106, the field strength of the time-varying magnetic field is not constant across the coil 106. As suggested by the space between the curved magnetic field lines, the magnetic field strength is greatest towards the left side of the coil 106 (towards the side where the innermost coil loop is centered) and is lower towards the right side of the coil 106 (towards the side where the outermost coil loop is furthest away from the innermost coil loop). The longitudinal position of the target 104 is shown at different longitudinal positions in the field 172. At longitudinal position 174, the target 104 is at a point where the magnetic field 172 has its greatest intensity or amplitude. At longitudinal position 175, the target is at a point where the magnetic field strength is less than it was at position 174. At longitudinal position 176, the target is at a point where the magnetic field strength is less than it was at position 175. At longitudinal position 177, the target is located at a point where the magnetic field strength is less than it was at position 176.

The eddy currents induced in the target 104 are greater at position 174, less at position 175 than at position 174, less at position 176 than at position 175, and less at position 177 than at position 176. Recall that greater eddy currents in the target 104 correspond to lower effective inductance of the coil 106. Thus, the variation of the intensity of the time-varying magnetic field 172 across the longitudinal axis of the coil 106—interacting with the eddy currents in the target 104—provides an indication of the longitudinal position of the target 104 in the form of a varying effective inductance of the asymmetric electric coil 106.

Figure 6:
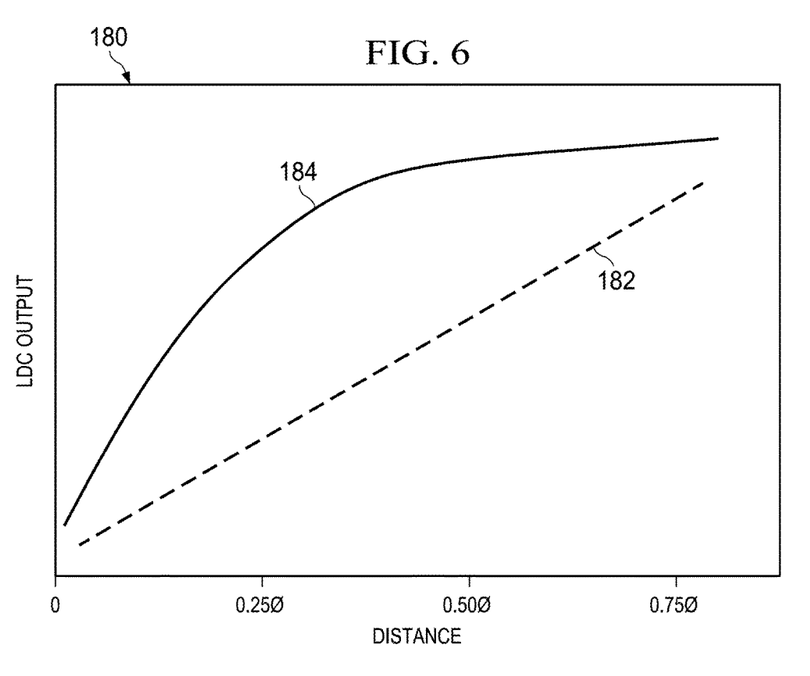
FIG. 6 shows a graph in accordance with various examples.

Turning now to FIG. 6, a graph 180 is described. In an embodiment, as the target 104 moves relative to the coil 106, the effective inductance of the coil 106 varies linearly with the longitudinal position of the target. The target 104 may have a known, fixed geometry and a known material composition. Additionally, the target 104 may remain at an approximately constant or fixed stand-off distance from the coil 106 as the longitudinal position of the target 104 varies. Thus, L=α(Displacement), where α is a constant of proportionality that may be positive or negative. This relationship between the effective inductance as a dependent variable and the displacement as the independent variable is illustrated by the curve 182. The coil 106 that is associated with curve 182 may be configured to generate a linear inductance versus target longitudinal position response to a conductive target when the coil loops are stimulated by an excitation signal.

In another embodiment, as the target 104 moves relative to the coil 106, the effective inductance of the coil 106 varies non-linearly with the longitudinal position of the target 104 (this may be a quasi-logarithmic relationship). This relationship between the effective inductance as a dependent variable and the longitudinal displacement as the independent variable is illustrated by the curve 184. The functional relationship between the effective inductance as a function of displacement can tuned by designing the asymmetric electric coil 106 physical configuration. The relationship between effective inductance and displacement of the target illustrated by curve 184 may be referred to as a non-linear relationship. In some circumstances, such a non-linear relationship between the effective inductance versus target longitudinal position may increase the signal-to-noise ratio and/or reduce the quantization error of the LDC 110. In other words, in an embodiment, the coil loops of the asymmetric electric coil 106 are configured to generate a non-linear effective inductance versus target longitudinal position response to a conductive target when the coil loops are stimulated with an excitation signal, for example when stimulated by an AC signal by the LDC 110.

Figure 7:
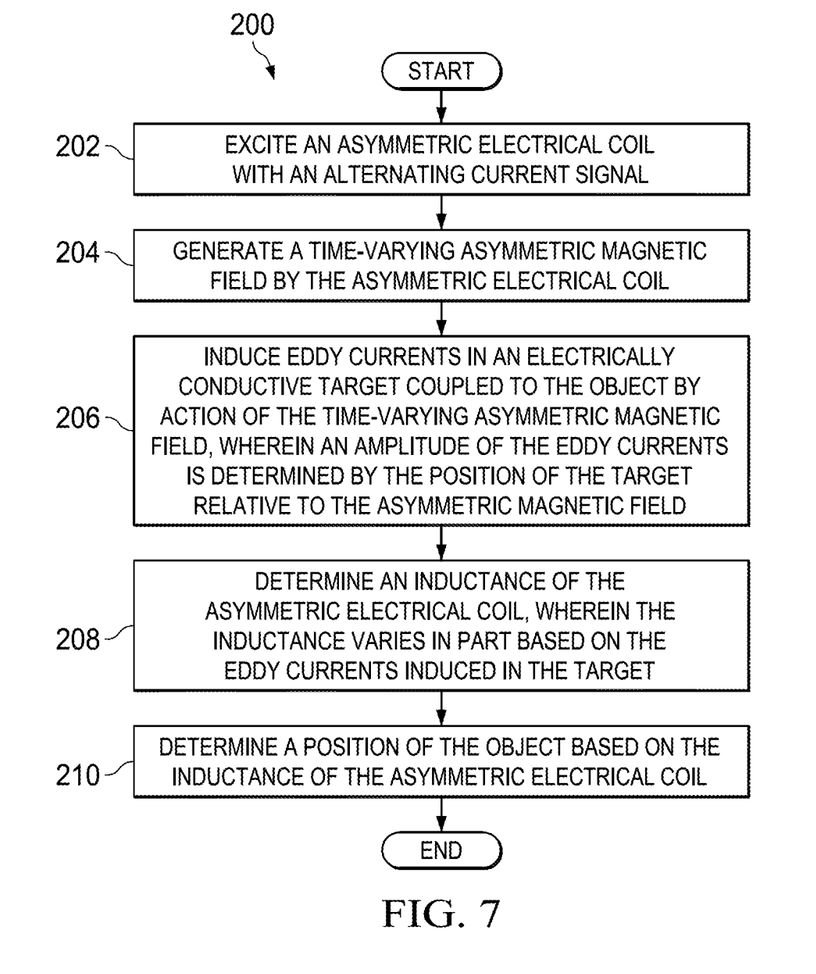
FIG. 7 shows a method in accordance with various examples.

Turning now to FIG. 7, a method 200 is described. The method 200 may be used to determine the longitudinal position of an object, for example an object to which a target is attached. At block 202, excite an asymmetric electric coil with an alternating current signal. At block 204, generate a time-varying asymmetric magnetic field by the asymmetric electric coil. At block 206, induce eddy currents in an electrically conductive target coupled to the object by action of the time-varying asymmetric magnetic field, wherein an amplitude of the eddy currents is determined by the longitudinal position of the target relative to the asymmetric magnetic field. At block 208, determine an inductance of the asymmetric electric coil, wherein the inductance varies in part based on the eddy currents induced in the target. Determining the inductance of the asymmetric electric coil includes identifying the resonant frequency and/or the oscillation frequency in a circuit comprising the asymmetric electric coil. At block 210, determine a longitudinal position of the object based on the inductance of the asymmetric electric coil.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A printed circuit board (PCB), comprising:
   a substrate that is non-conductive; and
   an asymmetric coil, formed on the substrate, the asymmetric coil having a plurality of coil loops that are conductive and asymmetric with respect to an axis transverse to a longitudinal axis of the asymmetric coil:
   a first distance between adjacent coil loops crossing the longitudinal axis on a first transverse side of a center of an innermost coil loop being substantially equal, and
   a second distance between the adjacent coil loops crossing the longitudinal axis on a second transverse side of the center of the innermost coil loop opposite to the first transverse side of the center of the innermost coil loop being larger than the first distance, the second distance increasing with each successively outward coil loop; and
   wherein the asymmetric coil is coupleable to receive an excitation signal and in response to project a time-varying asymmetric magnetic field.

2. The printed circuit board of claim 1, wherein:
   the asymmetric coil is coupleable to a transducer configured to provide the excitation signal to the asymmetric coil, to determine a response of the asymmetric coil to the excitation signal and to provide an output signal based on the response of the asymmetric coil to the excitation signal, the output signal corresponding to a lateral position of an external target relative to the asymmetric coil.

3. The printed circuit board of claim 1, wherein the second distance is at least two times greater than the first distance.

4. The printed circuit board of claim 1, wherein the plurality of coil loops are formed as a single continuous metal trace on the substrate.

5. The printed circuit board of claim 1, wherein the plurality of coil loops have one of a triangular geometry, a rectangular geometry, or an oval geometry.

6. The printed circuit board of claim 1, wherein the plurality of coil loops are configured to generate a linear inductance versus lateral target position in response to a conductive target when the asymmetric coil is stimulated with the excitation signal.

7. The printed circuit board of claim 1, wherein the plurality of coil loops are configured to generate a non-linear inductance versus lateral target position response to a conductive target when the asymmetric coil is stimulated with the excitation signal.

8. A position sensor, comprising:
   an asymmetric coil comprising a plurality of coil loops that are conductive, and asymmetric with respect to an axis transverse to a longitudinal axis of the asymmetric coil:
   a first distance between adjacent coil loops crossing the longitudinal axis on a first transverse side of a center of an innermost coil loop being substantially equal, and
   a second distance between the adjacent coil loops crossing the longitudinal axis on a second transverse side of the center of the innermost coil loop opposite to the first transverse side of the center of the innermost coil loop being larger than the first distance, the second distance increasing with each successively outward coil loop; and
   a transducer coupled to the asymmetric coil, wherein the transducer is configured to provide an excitation signal to the asymmetric coil to project a time-varying asymmetric magnetic field, to determine a response of the asymmetric coil to the excitation signal and to determine an output signal based on a response of the asymmetric coil to a lateral position of a target relative to the asymmetric coil.

9. The position sensor of claim 8, further comprising a capacitor coupled to the transducer and coupled in parallel to the asymmetric coil forming a parallel circuit, wherein the transducer is further configured to provide the excitation signal to the capacitor and wherein the transducer is configured to determine a response of the parallel circuit formed by the capacitor and the asymmetric coil, to determine an oscillation frequency of the parallel circuit formed by the capacitor and the asymmetric coil, and to determine the output signal based on the oscillation frequency of the parallel circuit formed by the capacitor and the asymmetric coil.

10. The position sensor of claim 8, wherein the time-varying asymmetric magnetic field is magnified by a relative permeability μ in theme target thereby causing an increase of an inductance of the asymmetric coil that varies in magnitude based on a position of the target relative to the asymmetric coil, and wherein the asymmetric coil is configured to present varying inductance in response to the time-varying asymmetric magnetic field induced in the target.

11. The position sensor of claim 8, wherein, in response to the time-varying asymmetric magnetic field, eddy currents are induced in the taregt that vary in magnitude based on the lateral position of the target relative to the asymmetric coil, and cause a varying inductance in response to a time-varying opposing magnetic field generated by the varying eddy currents induced in the target.

12. The position sensor of claim 8, wherein the transducer is an inductance-to-digital converter (LDC).

13. A method of determining position of an object, comprising:
    exciting an asymmetric coil with an alternating current signal, the asymmetric coil formed with a plurality of coil loops that are conductive, and asymmetric with respect to an axis transverse to a longitudinal axis of the asymmetric coil:
    a first distance between adjacent coil loops crossing the longitudinal axis on a first transverse side of a center of an innermost coil loop being substantially equal, and
    a second distance between the adjacent coil loops crossing the longitudinal axis on a second transverse side of the center of the innermost coil loop opposite to the first transverse side of the center of the innermost coil loop being larger than the first distance, the second distance increasing with each successively outward coil loop;
    projecting a time-varying asymmetric magnetic field by the asymmetric coil;
    inducing eddy currents in a target that is electrically conductive, by action of the time-varying asymmetric magnetic field, wherein an amplitude of the eddy currents is determined by a lateral position of the target relative to the asymmetric coil;
    determining an inductance of the asymmetric coil, wherein the inductance of the asymmetrical coil varies in part based on the eddy currents induced in the target; and
    determining the lateral position of the target based on the inductance of the asymmetric coil.

14. The method of claim 13, wherein determining the inductance of the asymmetric coil includes identifying a resonant frequency in a circuit comprising the asymmetric coil.

15. The method of claim 13, wherein the inductance of the asymmetric cicetric coil increases as the target moves from an outer edge of the asymmetric coil towards a center of the asymmetric coil increases.

16. The method of claim 13, wherein the inductance of the asymmetric coil increases as the target moves from an outer edge of the asymmetric coil towards a center of the asymmetric coil.

17. The position sensor of claim 8, wherein the second distance is at least two times greater than the first distance.

18. The method of claim 13, wherein the second distance is at least two times greater than the first distance.

* * * * *